(12) United States Patent
Schellmann et al.

(10) Patent No.: US 7,379,906 B2
(45) Date of Patent: May 27, 2008

(54) METHOD FOR ACQUIRING AND PROCESSING DATA OF BUSINESS TRANSACTIONS

(76) Inventors: Johannes Schellmann, Rabenhorst 29, 22391 Hamburg (DE); Hartmut Schellmann, Rabenhorst 29, 22391 Hamburg (DE)

( * ) Notice: Subject to any disclaimer, the term of this patent is extended or adjusted under 35 U.S.C. 154(b) by 1018 days.

(21) Appl. No.: 10/018,047

(22) PCT Filed: Apr. 4, 2001

(86) PCT No.: PCT/EP01/03844

§ 371 (c)(1),
(2), (4) Date: Apr. 22, 2002

(87) PCT Pub. No.: WO01/77914

PCT Pub. Date: Oct. 18, 2001

(65) Prior Publication Data

US 2002/0152142 A1    Oct. 17, 2002

(30) Foreign Application Priority Data

Apr. 10, 2000 (DE) ................................ 100 17 710

(51) Int. Cl.
*G06Q 40/00* (2006.01)
(52) U.S. Cl. ............................ 705/30; 705/35; 705/38

(58) Field of Classification Search .................. 705/30, 705/38, 35
See application file for complete search history.

(56) References Cited

U.S. PATENT DOCUMENTS 5,390,113 A * 2/1995 Sampson ..................... 705/30
6,442,533 B1 * 8/2002 Hinkle ..................... 705/36 R

* cited by examiner

*Primary Examiner*—Jagdish N Patel
(74) *Attorney, Agent, or Firm*—Blakley, Sokoloff, Taylor & Zafman LLP (57) ABSTRACT

A method for processing business transaction data. Data concerning business transactions are recorded. Predetermined accounts in which the values of the business transaction should effect a corresponding change of account values are associated with each business transaction. A record identifier which unambiguously identifies a ledger structure is associated with a corresponding book data set of which has an account identifier. An account object is formed for each account. An account object of a book account with which the selected ledger structure, and at least one account object of a cross-account are selected. The book data set and at least two partial entry data sets are generated. The at least two partial entry data sets are sent to the appertaining account objects of the book account. The partial entry data sets are received in the account objects and are stored in order in the appertaining store structures.

27 Claims, 3 Drawing Sheets

Account: Cash (No.: 0815) Cross-Account: ....

Financial Year: 01.01.2000 - 31.12.2000

| Entry Date | Recording Date | Record Number | | Additional Information (e.g. Text) | National Currency | | Foreign Currency | | |
|---|---|---|---|---|---|---|---|---|---|
| | | Book Abbrev. | Serial Number | | Decrease + Increase - | Balance | Exchange Rate | Decrease + Increase - | Balance |
| | | | | | | | | | |
| | | | | | | | | | |
| | | | | | | | | | |
| | | | | | | | | | |

— Input area (Display of data to be recorded)

— Display area for data of business transactions already booked

METHOD FOR ACQUIRING AND PROCESSING DATA OF BUSINESS TRANSACTIONS

This is a non-provisional application claiming the benefit of International application number PCT/EP01/03844 filed Apr. 4, 2001.

The invention relates to a method of acquiring/recording and processing data concerning business transactions in a computer system.

Computer-assisted methods of recording (i.e. acquiring) and processing data concerning business transactions constitute the basis of modem-day electronic bookkeeping. Before the introduction of mechanised bookkeeping, bookkeeping was based (hence its name) on bound books with a special division of the pages into columns and lines in which the business transactions were entered manually in an ordered form, i.e. in their chronological sequence. The ledger formed the principal instrument of bookkeeping. In this ledger details were entered line by line each relating to a business transaction. As a rule the entry included the time of the business transaction, a description of it and numerical values which related primarily to incomings and outgoings of cash values in a specific currency and in addition related optionally to specific quantities. The cash values were entered in predetermined columns which related either to persons (columns for customers and suppliers) or not to persons (columns for goods). Moreover, separate columns were kept respectively for incomings and outgoings, i.e. for debit (positive values) and credit (negative values). The values entered on the pages of the ledger were added up column by column. The said debit and credit columns merely served to simplify the adding up. The business transactions were entered in such a way that the "cross"-sum of all column totals of the columns concerning cash values must equal zero.

Apart from the chronological recording in the ledger, the records of the business transactions were entered separately according to the type of business transaction (for example supply invoicing to a customer, receipt of invoice from a supplier, incomings and outgoings on a bank account) and optionally separately according to persons (suppliers and customers) in further subsidiary books. At the end of a period of time, for example a business day, it was checked whether the totals of the subsidiary books tallied with those of the ledger.

With manual bookkeeping there was a later changeover to copy bookkeeping (looseleaf bookkeeping) based on loose accounts sheets. This system consisted of a ledger and of various types of accounts sheets. In addition to columns for entry date, entry number and text, the ledger contained three double columns for debit and credit, and in the fields adjoining the text column these double columns were arranged to the left, the middle or the right. The various types of account basically took over this division of the lines and columns, but depending upon the type of account the left, middle or right double column was used. Entries in the various accounts (for example property accounts, debtor and creditor accounts) were copied as they were entered onto the ledge (by means of carbon paper). In this case attention had to be paid to the correct arrangement of the superimposed sheets and to entry in the correct columns. This was assisted by specific divisions of the sheets and coloured identifications. In order to reduce the work involved in picking out and putting back account cards in file card boxes, the ledger was expanded by additional columns, the journal. Similar cross-entries were made in the individual columns. The respective total was recorded, as a rule after further processing, as a collective entry. For specific accounts in subsidiary bookkeeping systems (for example wages and salaries accounts, equipment accounts and materials accounts) similar copy bookkeeping arrangements were kept separately.

Based on the described basic principles and basic structures of manual bookkeeping, in the course of technical developments automatic accounting machines were then developed. The first mechanical versions of automatic accounting machines or devices for recording business transactions were based on a mechanical typewriter which was adapted to the requirements of copy bookkeeping. Entry in the correct positions and the correct co-ordination of the copy sheets were assisted by corresponding guides and mechanical counting means. As electronics arrived in this field, automatic accounting devices were provided with read-write heads and the accounts sheets were provided with magnetic strips.

Later digital computers were used for electronic accounting, in which accounting programs were run on the computer's processing unit (central unit, CPU) which controlled the electronic recording of data concerning business translations, the processing and storage of these data and the display and printout of these data. In this case the configuration of these data processing systems including their programs and data always corresponded to the organisation as already prescribed by the manual bookkeeping. The business transactions were stored in data sets. Tables which stored the data sets in chronological order (sorted and/or indexed) corresponded to the ledgers. These basic features are to be found in the equipment and methods which are usual nowadays for computer-assisted recording, processing and display of data concerning business transactions which are based on business management or accounting programs.

The data concerning business transactions are stored in entry batches as they are recorded (input by an operator). These recorded business transaction data have the function of a ledger. For every entry an entry data set is generally produced which, in addition to the values to be entered, specifies the relevant account and subsidiary accounts with the aid of the account numbers. In order to be able to carry out an analysis of the totals produced for an account the entry data sets are usually browsed successively and the entry data sets which concern the desired account are filtered out. This "filtering out" of the data sets concerning a specific account from a large number of data sets slows down the analyses considerably. The entry values concerning the desired account are then added (balanced), and a differentiation according to positive and negative values (debit and credit) can be made. Thus after such a run-though (or batch run) carried out within the framework of an analysis the account balances are obtained which are then processed for further business management analyses (e.g. balance sheet, profit and loss calculation). As a rule such analysis runs are carried out after the end of each month. A disadvantage of this is that also current analyses can only be obtained in each case after the conclusion of a batch run carried out possibly contemporaneously at the end of a month. In spite of a contemporaneous recording of the data concerning the individual business transactions, a constantly current analysis of these business transactions is not possible. In the case of large quantities of data concerning business transactions to be processed, updating by means of analysis runs at the end of predetermined time intervals also brings with it the disadvantage that these analysis runs themselves again take a considerable time, so that in practice current analyses are never available.

The object of the invention, therefore, is to create a method of recording and processing data concerning business transactions in a computer system which facilitates a quicker creation of current business management analyses.

This object is achieved according to the invention by a method with the features of claim 1.

The method for recording (i.e. acquiring) and processing data concerning business transactions is carried out in a computer system with at least one processing unit (e.g. a CPU), at least one storage unit (for example RAM, ROM, disk storage device), input means (for example keyboard, mouse, microphone with speech recognition means) and output means (e.g. display screen or printer) and with data communication means which connect the input and output means and the units of the computer system to one another. The computer system may comprise one single computer or also a plurality of computers linked to one another via a network. The data communication means encompass the bus systems as well as the network communication means.

The data concerning a business transaction specify its type and time and values of the business transaction which are associated with this time and indicate changes. Associated with each business transaction are predetermined accounts in which the values of the business transaction should effect a corresponding change in account values. Thus the time of a business transaction is the time at which due to economic targets and/or legal requirements the change of value which characterises the business transaction is to become effective on the associated accounts. The changes include for example disposals of cash and/or goods. The values of the business transaction are characterised by an amount with a preceding sign, and the preceding sign can be specified implicitly by the type of business transaction. The values can additionally be characterised by a unit, for example a currency or a unit of quantity, in which case in the even of erroneous information concerning a unit this follows implicitly from the type of business transaction (for example implicit assumption of the national currency). The values for the business transaction should effect a "corresponding" change of account values, i.e. the changes of account values do not need to be identical to the values of the business transaction. Account values are for example stock values or yield values which relate to an economic enterprise in a business year.

In the method according to the invention at least one ledger structure is provided which has a store structure for ordered storage of book data sets, each book data set being associated with a business transaction. A ledger structure should be understood here quite generally to mean a structure for ordered collection of records of any type. Each book data set is associated with precisely one business transaction, whereas one business transaction can also effect several book data sets. Each book data set (i.e. each data set of a ledger structure) has associated with it a record identifier which unambiguously characterises the ledger structure and the book data set in the ledger structure, and each book data set has an account identifier. The record identifier is produced for example from the identification number of the ledger structure and a serial number of the book data set in a list or table. The record identifier is "associated with" the book data set, i.e. the identifier of the ledger structure does not have to be contained in the book data set; it can ensue implicitly from the book. Likewise the identifier of the book data set in the ledger structure also does not need to be contained in the data set; it can follow implicitly from the position or address of the data set. The account identifier is the most significant content of a book data set (in addition to this, the book data set can contain further information, for example entry texts); the account identifier can for example contain account numbers. The account identifier identifies at least two selected accounts which depend upon the type of business transaction. One of the at least two selected accounts is a book account with which the ledger structure is associated. The other account or the further accounts of the at least two selected accounts are cross-accounts associated with the book account. A ledger structure can also be associated with a plurality of book accounts.

In the method according to the invention, for each account an account object is formed, an object being understood to mean a structure which encompasses not only data (also denoted as status) but also operations which can be carried out on or with the data (also denoted as methods). This object can be accessed by means of an exchange of messages via previously defined interfaces. Each account object has an identifier data structure and a store structure for ordered storage of partial entry data sets (or partial data sets). A "structure" should be understood here to mean a logical arrangement of data or statuses of any type. The identifier data structure identifies the appertaining account and moreover preferably specific relations to other accounts and specific operations, for example the form of the display presentation of data of this account. Each partial entry data set (or partial data set) of the store structure contains the record identifier of a book data set associated with it as well as at least one value of a business transaction which should effect a corresponding change of account values. The partial entry data sets together with the associated book data set of the ledger structure form a total entry data set. A business transaction can generate a plurality of total entry data sets. The partial entry data sets stored in the store structures for ordered storage of the account objects fulfil a record function. In contrast to the prior art, however, these entry data sets are no longer required for the usual business management analyses later after the method according to the invention has been carried out in the recording of business transactions. The record identifier contained not only in the book data sets but also in the appertaining partial entry data sets facilitates co-ordination of these components of the total entry data set and optionally a subsequent retrieval in the search for individual entries. In addition to the at least one value of the business transaction which should effect a corresponding change of account values, each partial entry data set can also preferably contain further data (values, information text, etc.) concerning the account.

In the method according to the invention, in the recording of data concerning a business transaction the following steps are carried out:

In a step (a) a ledger structure, an account object of a book account with which the selected ledger structure is associated, and at least one account object of a cross-account are selected as a function of the type of business transaction, and the data concerning the business transaction are read in. "Read in" means quite generally here that the data are obtained from an input buffer (which is filled on the basis of user input) or are transmitted from time-dependent provided data from a program for automated business transactions (for example automatic depreciation entries). Other forms of data acquisition are also conceivable.

In a step (b) a book data set and at least two partial entry data sets are generated from the read-in data and the book data set is stored in order in the selected ledger structure.

This is achieved for example by a program associated with the account object of the book account.

In a step (c) the at least two partial entry data sets are sent to the appertaining account objects of the book account and of the cross-account or the cross-accounts, the partial entry data sets containing the values of the business transaction which should effect corresponding changes of account values.

Finally in step (d) the partial entry data sets are received in the account objects and stored in the appertaining store structures for ordered storage.

The steps (a), (b), (c) and (d) do not strictly need to be carried out in the stated sequence. For example, after the selection of a ledger structure first data can already be read in, and then a book account can be selected on the basis of the first data. After selection of a book account further data can already be read in and from these a book data set and a first partial entry data set for the account object of the book account can be generated. This generated partial entry data set can also already be sent to the account object of the book account before a cross-account is selected. In alternative embodiments of the method according to the invention it may prove sensible first of all to read in all the data, to generate the book data sets and partial entry sets before the first partial entry data sets are sent to the accounts.

In recent years there have been significant increases in both the processing power and the storage capacity of computer systems; further increases in power are to be expected. The method according to the invention uses these increases in power in an ideal way by allowing an increase in the message traffic between account objects in order to facilitate a contemporaneous updating and thus a high speed in the creation and output of analyses. The account objects can for example remain on various computers with different hardware equipment and operating systems which are connected to one another via a network (for example a LAN or an intranet/internet using the TCP/IP). Furthermore, the method according to the invention is suitable for the use of an object-oriented system, particularly for the use of an object-oriented programming for creation of the software structures which are necessary for carrying out the method. The use of the object-oriented approach also facilitates the simple introduction of a comprehensive security concept for the data processing and the protection of the assets of the enterprise.

A preferred and advantageous variant of the method according to the invention is characterised in that the account objects also each have at least one collective store structure. Each collective store structure (which is present for example in the form of a list or table) comprises a plurality of data storage fields, wherein each data storage field is associated with a time interval having a start time and an end time within a calendar year and stores a sum value. The start and end times of a first number of data storage fields are chosen so that the time intervals each correspond to a calendar month, i.e. there is a data storage field or a plurality of data storage fields for each calendar month in the collective store structure. The selection of calendar months as primary time intervals is based on the usual requirements of an accounting system. Naturally, further data storage fields can be associated with further or other time intervals. Each sum value is produced from a start value and addends. The addends are in each case a predetermined function of the values of a business transaction. The start value in the data storage field of a collective store structure of an account object can for example be zero. By means of the predetermined function the addend depends upon the values of one single business transaction, but conversely a business transaction can effect a plurality of addends. The predetermined function is preferably the same for each data storage field of a collective store structure. In step (d) after the receipt of the partial entry data sets the collective store structures are updated by adding up the addends formed from the values of the business transaction contained in the partial entry data sets in the data storage fields corresponding to the time of the business transaction. The ordered storage of the partial entry sets and the updating of the collective store structures can be carried out in any sequence.

These collective store structures increase the speed of analysis still further. Current sum values are continuously held for the account object provided with the collective store structure; with regard to these sum values the monthly batch runs can be omitted.

An advantageous variant of the method according to the invention is characterised in that the collective store structures have a second number of data storage fields in which the start and end times are chosen so that the time intervals in each case correspond to a calendar day, and that not only the time intervals of the first number of data storage fields which each correspond to a calendar month but also the time intervals of the second number of data storage fields which each correspond to a calendar day completely cover the time interval of a calendar year once. The provision of separate data storage fields for each calendar day has the advantage that current analyses on the basis of the account values can also be created within the months at high speed. Furthermore, those financial years which differ from the calendar year and end in the course of a month, as well as the conversion from a financial year corresponding to a calendar year to a financial year which differs from the calendar year, do not present any difficulties. If this is desired, this embodiment of the method according to the invention can also be further developed so that a third number of data storage fields is provided in which the time intervals each correspond to an hour of the calendar day. These advantageous further developments do indeed require substantially greater amounts of storage, but in view of technical developments the provision thereof is increasingly less problematical. Advantageously the plurality of data storage fields comprises at least one data storage field of which the time interval corresponds to the entire calendar year. Thus this data storage field (also called a year store) contains the total result of the calendar year which can be retrieved updated at any time.

The start values of the data storage fields can preferably be set either to equal zero, to a sum value of a data storage field of the same collective store structure or to the sum value of a data storage field of another collective store structure of the account object. When the start value of a data storage field is set to zero, then only the addends which are a function of the values of those business transactions of which the times fall within the time interval of the data storage field, i.e. in the course of the month or of the day, are added up in the data storage field. The case where the start values of the data storage fields are set to the sum value of another data storage field of the same collective store structure encompasses above all the case where the start value of a data storage field is set to the sum value and thus simultaneously to the end value of a data storage field associated with a preceding time interval. For example the start value of a day store is set to the sum value of the day store of the preceding day. If the start value of the day store of the first day of a month is then set to zero, as a result the day stores contain a sum value which relates to a time interval from the beginning of the month up to the respective day. If on the other hand the start value of the first day of a month is set not to zero but to the end value of the last day of the preceding month, then all day stores of this collective store structure contain the sum values which relate to a time period from the beginning of a year up to the respective day.

The predetermined function according to which the addends are calculated from the values of the business transaction preferably encompasses the following five cases: In a first case the addend is set equal to a value of the business transaction. Thus the resulting sum value corresponds to a balance of the appertaining values of the business transaction for the respective time interval. In a second case the addend is set equal to a value of the business transaction so long as this is greater than zero; otherwise the addend is set equal to zero. This produces a sum value which only adds up the positive values of a business transaction and corresponds to a credit balance. The same applies to the third case, in which the addend is set equal to a value of the business transaction so long as this is less than zero, and otherwise is set to zero. This produces a sum value which corresponds to a debit balance. In the fourth variant a value of the business transaction is multiplied by a constant factor in order to calculate the addends. This is used for example in a store structure which serves for storage of a quantity of goods in units of mass (for example in kilograms), in which however the value of a business transaction, for example a discharge quantity, is present in a unit of volume (for example in liters). The constant factor then corresponds to a standardised density (mass=density*volume). Finally, in a fifth case a value of the business transaction is multiplied by a variable factor held in a data storage field of a further collective store structure which corresponds in the time interval. This case can be used when the values in the collective store structure are stored in a foreign currency but the input is made in the national currency. The variable factor then corresponds the changeable exchange rate. The exchange rates are held in a further collective store structure, and their entry is updated in each case at the beginning of the time interval with the aid of a message containing the exchange rate which is sent to the account object.

The store structure for ordered storage of the book data sets of the ledger structure and the store structures for ordered storage of the partial entry data sets of the account objects are preferably sorted or indexed lists or tables which are sorted or indexed according to the serial number of the entry of the data sets or according to the time of the business transaction. Lists or tables could also be used which are indexed according to several criteria, for example not only according to the serial number of the entry of the data sets but also according to the time of the business transaction. Such lists or tables can be produced and managed in a simple manner; the tools for manipulating them are well known in the prior art.

An advantageous variant of the method according to the invention is characterised in that the identifier data structures of the account objects of the book accounts each contain an indication of the cross-accounts which can be associated with them. In method step (a) the at least one account object of a cross-account is then selected as a function of the indication of the cross-accounts which can be associated with the book account. Advantageously the identifier data structures of the account objects of the cross-accounts each contain an indication of those accounts with which they can be associated as cross-accounts. Account objects which concern accounts which can be not only book accounts but also cross-accounts preferably contain both indications. For example, the accounts contain as indication a table for accounts and cross-accounts. The provision of such an indication increases the security in recording data concerning business transactions, because with it the possibility of erroneous inputs and association of incorrect accounts is reduced.

In a preferred variant of the method according to the invention analysis diagrams are provided which have positions with position values, wherein changes of account values effect changes of predetermined position values. The analysis diagrams in a graphical representation can for example be in the form of a table with lines and columns; the positions are then the individual table fields. For example, account values or position values which are calculated from account values can be represented in these table fields. In the preferred variant of the method according to the invention, for at least one selected position of an analysis diagram an analysis object is formed which has an identifier data structure and at least one collective store structure. The makeup of the collective store structure of the analysis object corresponds to the makeup of the collective store structure of an account object. However, in the collective store structure of the analysis object the addends are a predetermined function of those changes of account values which are effected on the basis of business transactions of which the time falls within the time interval. In the recording of the data of a business transaction the following further steps are then carried out. In a step (e) at least one update data set determined for a selected position of an analysis diagram is generated from the values of the business transaction contained in a partial entry set. The update data set is generated in at least one account object of those account objects which have received a partial entry data set. The update data set is then sent to at least one analysis object associated with the account object. Then in a step (f) the update data set is received in the at least one associated analysis object. Then the collective store structure of the analysis object is updated by adding up the addends formed from the values contained in the update data set in the data storage fields corresponding to the time of the appertaining business transaction.

This use of analysis objects and update data sets according to the preferred embodiment of the method according to the invention has the advantage that certain positions (for example table fields) of analysis diagrams (for example a profit and loss calculation) which result from certain account values are continuously updated. This facilitates an immediate retrieval of the totals of values of different accounts for certain analyses. For example the account objects which are each associated with a debtor (customer) send update data sets to an analysis object which combines a group of debtors. This combination of a group of account objects into one analysis object also simplifies the recording and processing of data of planned business transactions. When the method according to the invention is used for the processing of data concerning planned business transactions it is hardly possible to carry out simulation of planned business transactions for individual customers (debtors). Instead of this, values for a group of debtors and thus a group of debtor accounts can be simulated and recorded with the aid of the method according to the invention. These planned values which are held in collective store structures of the analysis object can then be compared later in the current financial year with the continuously updated actual values for a group of debtors. In the absence of the analysis object this would require the continuous addition of the individual accounts.

The said preferred embodiment of the method according to the invention is preferably characterised in that for the partial entry data sets and the update data sets a standard format is used and that messages of a standard format are generated for sending the partial entry data sets and the update data sets to the account objects or analysis objects. This simplifies the system of program and data structures to be created for the implementation of the method according to the invention and facilitates the exploitation of the advantages of object-oriented programming.

In the said preferred embodiment of the method according to the invention the identifier data structure of the account object generating the update data set preferably has a list of analysis object identifiers of the associated analysis objects. For example, the analysis object identifiers are likewise unique character strings or numbers which like account numbers are assigned to the analysis objects. Each account object which generates update data sets then contains a list of the analysis object identifiers.

In a variant of the preferred embodiment of the method according to the invention the analysis diagrams have positions of a lowest level with which predetermined collective store structures of predetermined account objects are associated. As a function of an output command indicating an analysis time in a financial year a graphic output of an analysis diagram is generated via an output means. The analysis time is for example a qualifying date. In the graphic output, the total of the sum values of those data storage fields of the collective store structure of the account object of which the time intervals cover the time period from the beginning of the financial year up to the analysis time (exactly once) is output at each position of the lowest level which is associated with an account object. The total of the sum values of those data storage fields of the collective store structure of the respective analysis object of which the time intervals cover the time period from the beginning of the financial year up to the analysis time is output at the selected positions which are associated with analysis objects. At the remaining positions values are output which are calculated from the values of other positions. Thus in order to calculate the output values of a graphic output of an analysis diagram only a few addition operations are necessary. Thus the output of the analysis diagram can take place in the shortest time. Preferably those positions of the analysis diagram which add up a large number of account values are provided as selected positions with analysis objects.

Input buffer stores in which the incoming values of the partial entry data sets or update data sets are buffered until the respective collective store structure can be updated with the values are preferably associated with the collective store structures of the account objects and analysis objects. These input buffer stores are always advantageous when the updating of a collective store structure must be deferred because of a priority of other processing operations. When during the generation of a graphic output the input buffer store of an account object or an analysis object still contains values with which a time before the analysis time is associated, then the graphic output generated from the collective store structure cannot contain any exact values. In this case a notice to the user is generated which informs him that there are still unprocessed values in the processing pipeline.

Preferably all account objects have at least a first collective store structure of which the sum values correspond to an amount which relates to a first unit, preferably to a national currency. As a rule all account objects and analysis objects have such a first collective store structure for the values in the national currency. Furthermore, certain account objects can have further collective store structures of which the sum values each correspond to an amount which relates to a second unit. The second unit can for example be a foreign currency or a number of items, a mass or a volume of certain goods. With the aid of such account objects it is possible to generate quickly not only analyses in the national currency but also certain analyses which relate for example to a foreign currency or to stocks of goods (for example for the planning of orders).

In preferred variants of the method according to the invention the account objects and analysis objects contain not only actual collective store structures for the current calendar year which store values resulting from business transactions actually concluded, but also collective store structures for one or more elapsed calendar years. This permits the simple and quick generation of output of analysis diagrams which contain comparisons with elapsed financial years. In a preferred embodiment parallel actual collective store structures for the current calendar year three elapsed financial years are provided. The data for earlier years are held in an archive. In a preferred variant of the method according to the invention account objects and analysis objects selected for planning each have at least one plan level collective store structure for the current calendar year and one or more future calendar years which store values resulting from planned business transactions. Planned business transactions simulate future actual business transactions. In the method according to the invention the data for planned business transactions are recorded and processed with the aid of plan level collective store structures of the account objects and analysis objects in the same way as the data for actual business transactions with the aid of actual collective store structures. Thus for the planning of business transactions a system is used which is identical to the actual accounting. This facilitates a simple comparison of the plan data with the actual values. Plan level collective store structures are set up for example for the current calendar year and five future calendar years. In addition an overflow store structure can be set up for plan data which relate to business transactions lying further in the future (for example long-term credits or depreciations). Other process level collective store structures can be set up between the level of the plan collective store structure and the level of the actual collective store structure. For example the account objects and analysis objects can each have at least one process level collective store structure for the current calendar year and one or more future calendar years which store values which result from values for uncompleted business transactions resulting from purchase, storage, production and/or sales agreements to be implemented in the respective calendar year. In a preferred embodiment of the method according to the invention up to four levels of collective store structures can occur in a calendar year: a plan level, a process level (for purchasing, storage, production and sales), a liquidity calculation level and an actual level.

Due to the passing of time, and particularly due to the turn of the year, plan years become the current year or the current year becomes a previous year. In each case a new plan year ensues, for which initially only the plan level and/or further levels are set up and thus held ready. In the further course of time the process level is immediately booked. When a plan year becomes the current year the actual level is processed. The plan level can also be retained for elapsed years if for example analyses regarding the quality of the planning are required.

Further advantageous variants of the method according to the invention are characterised in the subordinate claims.

The invention is described in greater detail below with reference to a preferred embodiment. In this explanation reference is made to drawings in which.

In the following detailed description essential components of an integrated planning, bookkeeping, monitoring and reporting system are described in which the method according to the invention is implemented. The system is capable of displaying on a screen (or printing out) all analyses which are necessary for management of the business after they are called up with current values, the data being constantly updated. Essential components of the integrated planning, bookkeeping, monitoring and reporting system are a plurality of account objects which are based on a universal basic account object. The system further comprises standard analysis schemes for generation and output of business management analyses, these standard schemes accessing not only the account objects but also additional analysis objects, wherein the analysis objects contain data which result from the data of the account objects and are constantly kept up to date by transmission of data sets from the account objects to the analysis objects. Not only the account objects but also the analysis objects use a universal collective store structure for holding the constantly updated data. The account objects, analysis schemes and the store structures as well as their use in methods for recording, processing and output of data concerning business transactions are explained in greater detail below.

In the introduction it has already been explained what is to be understood by a business transaction. In the following description a business transaction may for example be assumed which is based upon an invoice being sent to a customer. The time of the business transaction is for example the time of issue of the invoice or the invoice date. The values of the business transaction are the sums of money contained in the invoice as well as the delivery quantities stated on the invoice. Issue of the invoice constitutes the type of business transaction. In order to record such an issue of an invoice in a bookkeeping system it is usual for example for the invoice amount (turnover tax is ignored here) to be booked to a debtor account for the invoice addressee (customer) and for the proceeds to be booked to the cross-account. Thus the recording of the data concerning the business transaction usually comprise storage of the data in association with at least two accounts. In this case the sums of money booked to the accounts must cancel each other out or be equal in a predetermined currency.

If subsequently further invoices are issued for example for the same customer or for other customers, then this results in several similar business transactions which lead to similar entries on the same accounts (realisation account or debtor account of a customer) or on several similar accounts (debtor accounts of several customers). If for example an analysis required concerning the invoicing business transactions, then certain values of the entry sets recorded on the accounts are to be added up over predetermined time intervals (months and days of a financial year for example) and the totals are to be output in a suitable form (analysis scheme).

In the system described here, first of all account objects are provided which comprise not only all data concerning an account but also all operations which can be carried out on these data. An account object constitutes a closed entity which can only be accessed via a defined interface. In order to access the account object, messages are transmitted to the account object or are received from the account object via this interface. The messages transmitted to the account object comprise partial entry data sets, i.e. those parts of a data set based on a business transaction which concern the respective account.

Account objects are formed for all accounts required in the accounting system. For example debtor account objects for each customer of a business, creditor account objects for each supplier of the business, bank account objects for each bank account, materials account objects for each type of material, property accounts for each type of goods, property accounts for property such as buildings, land and movable economic goods, and many further account objects are provided.

Figure 1:
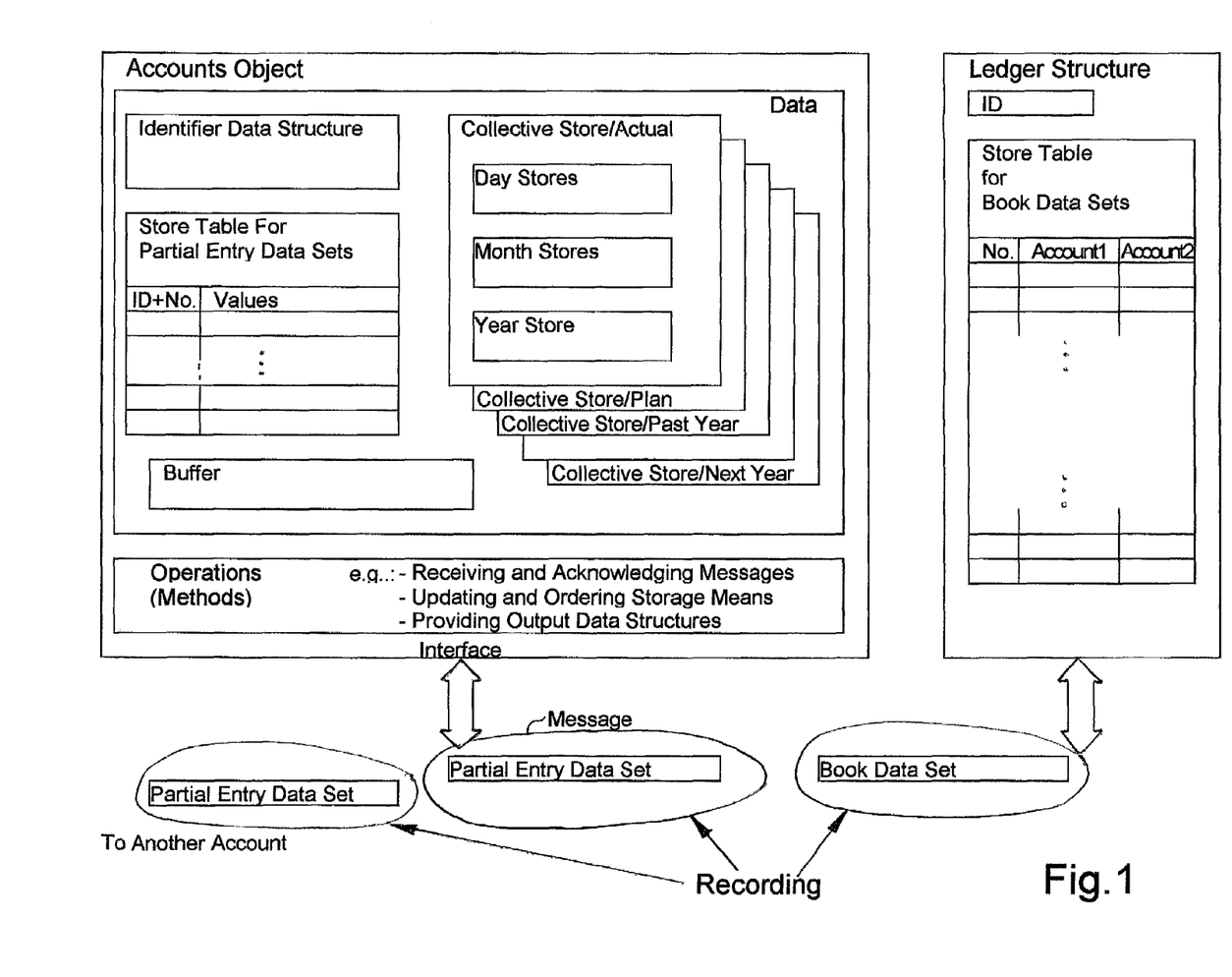
FIG. 1 shows a diagrammatic sketch which illustrates an account object, a ledger structure and the messages transmitted in the recording of data concerning business transactions.

As shown in FIG. 1, the data of the accounts objects first of all comprise an identifier data structure. The identifier data structure contains data identifying the account (for example an account number, an address or a characteristic character string) and data which characterise certain properties of the account. The data of the account object further comprise a store table for partial entry data sets, i.e. parts of entry data sets which concern the account. The partial entry data sets are stored in order, preferably in chronological order, in this store table. In addition to an unambiguous identification the partial entry data sets contain values of the business transactions which are to be booked to the appertaining account. The identification data will be described later with reference to the ledger structure used for entering. The values comprise not only the currency amounts which are crucial for financial accounting but also, depending upon the type of account, foreign currency amounts, details of quantities and additional information of the partial entry data set.

The account objects further contain a plurality of collective store structures. A collective store structure comprises a plurality of data storage fields which are each associated with time intervals and which store a sum value formed from a start value and an addend, where the addends are in each case a predetermined function of the values of a business transaction. The time intervals are preferably calendar days, calendar months and the calendar year associated with the collective store structure. Thus for each of the 365 days (366 days) of a calendar year, each of the 12 calendar months and for the year a respective data storage field is provided. In the simplest case the function with which the addend is produced from a value of a business transaction is an equation, so that the value of the business transaction is added up directly in one of the day, month or year stores. In the simplest case the totals of the values of those business transactions of which the time falls within the respective time interval are stored in the data storage fields of the collective store. In this case the start value ca be set to zero or to the end value of a data storage field of a preceding time interval. In the first-mentioned case each day store for example stores the total from the business transactions of the respective day; in the second case each day store stores the total of all business transactions from the beginning of the year or of the month up to the respective day (including the business transactions occurring on the day). In a simple summing collective store incomings are added and outgoings are subtracted. If the closing stock of a previous year is chosen as the start value for the first day store (for the 01.01.), the first month store (January store) or the year store, then the respective store indicates the current stock. Such a configuration may be chosen for example in the case of account objects of stock accounts. Alternatively it is possible to keep the end value of the previous year in a separate store and then to add it to the respective value of the current year when an analysis is required. In the case of account objects of yield accounts the start value of a collective store structure is set to zero. Preferably in the case of each account object such a simple collective store structure is provided which simply balances up the values of the business transactions concerning the respective account which are relevant for the financial accounting. Such a collective store structure which contains the balance of the respective account (yield account or stock account) allows for example a simple analysis for a profile and loss calculation or a balance sheet for a freely chosen qualifying date within the current calendar year. The operations (methods) used for the analysis then only need to access the respective day and month stores and do not need to add up all the partial entry data sets for the relevant time period.

Furthermore in the case of certain account objects further collective stores are provided in which the addends are another predetermined function of the values of the business transactions. For example separate collective store structures for debit and credit values of the business transactions are provided. Then the value of the addend which is added up in the data storage field of a collective store structure depends upon the sign preceding the value of a business transaction. Moreover, collective store structures can be provided for quantity values. For example, a collective store structure which stores a stock quantity of a fluid, for example heating oil, in units of volume, for example in liters, can be provided. Then when the values of a business transaction, for example the quantity of heating oil, are stated in a unit of weight, for example in kilograms, then for the addition in the collective store structure the weight given in the business transaction for an incoming or outgoing of heating oil would have to be converted into a volume. This takes place by multiplication by a factor which depends upon the density of the heating oil. This means that the addend for the collective store would be a product of a value of a business transaction and a fixed predetermined factor. The factor can for example be stored in the identifier data structure of the account object. Finally, a case is also conceivable in which the value of a business transaction is multiplied by a variable factor. This may be the case for example when the value of a business transaction is a currency amount in the national currency and the additional collective store structure stores the corresponding currency amount in a foreign currency with variable exchange rate (for example a group currency). The variable exchange rate can beheld in a further collective store structure of the account object.

Finally the account objects can contain a further store structure which is denoted in FIG. 1 as a buffer. The buffer store structure serves for example to record the received partial entry data sets before they are stored in (chronological) order in the store table or before their values are added up on the collective store structure. Furthermore the buffer store structure can serve to record store contents prepared for a display. The operations by which the data are stored in the buffer store structure and removed from the buffer store structure and inserted into the store table or by which the values in the collective store structure are added up are likewise components of the account object.

The chronologically ordered store table for partial entry data sets and the collective store structures are first of all provided for the current calendar year. Furthermore, however, the account objects can also contain store tables and collective store structures for past calendar years. Also collective store structures for future or plan years are also preferably set up, for example for five years ahead. Finally several levels of collective store structures are provided not only for the current year but also for some future years: a level for the actual values of the actually accomplished business transactions, a liquidity level, a level for uncompleted business processes (i.e. for future business transactions for which an agreement already exists) and a level for planned values. Further levels, for example for global plans and detailed plans, are conceivable. The collective store structures for the plan level are first of all set up for as many plan years ahead as correspond to a plan period. With the expiry of a calendar year in each case a new plan year is opened up and the corresponding collective store structure set up. The input or recording of planned values corresponds to the input of data concerning business transactions at the plan level. If at a later stage concrete agreements concerning future deliveries or orders for goods are concluded, then these data are recorded as business transaction data in the second level, the process level or level for unfulfilled business processes. In the third level, the liquidity level, for example deliveries of goods are recorded for which not invoice has been issued as yet. Finally in the fourth level, the actual level, which constitutes the actual bookkeeping level, the invoicing or receipt of money is then for example recorded.

Thus the integrated planning and accounting system has the advantage that a unitary structure is used for the planning and the accounting. This for example simplifies checking of the quality of the planning with reference to the actual business transactions.

A ledger structure is also shown in FIG. 1. The ledger structure has an identifier, for example a book abbreviation in the form of a number or a character string. The ledger structure further contains a store table for book data sets. The ledger structure is an essential element in the orderly recording of entry sets which are preferably recorded chronologically and fulfils the essential aspects of the record function. The term "ledger structure" points to a function similar to the conventional ledger. The ledger and also the ledger structure serve for recording the entry operations in chronological sequence. The ledger contained not only a serial number (entry number) but also the accounts concerned by the entry (account numbers) and other pieces of information such as for example an entry text. In order to combine the values of an account which are to be entered, all entry data sets of the ledger which concern this account would have to be combined (added up). In contrast to the known ledger, the ledger structure of the system according to the invention merely records the account numbers concerned by an entry data set and an identifier. The identifier and the account numbers together form the essential content of the data sets, which are called book data sets here, stored in an ordered store table of the ledger structure. The values of the entry which concern the respective accounts as well as further information are no longer stored in the ledger structure but as partial entry data sets in the respective account objects.

In the simplest case the accounting system according to the invention can contain a ledger structure for all accounting operations. However, the accounting system preferably contains a plurality of ledger structures which are associated with certain subject areas. For example a ledger structure with the name "sales book" can be provided for all debtor entries, in which case the ledger structure is associated with the debtor accounts. A further ledger structure with the name "Deutsche Bank, national currency, current account" can for example record only the incomings and outgoings associated with a bank account and can be associated with this bank account.

When the data of a business transaction are recorded, a ledger structure is selected. This takes place for example by means of a corresponding user input. Then for example the user notifies that the input of a business transaction into this ledger structure (for example into the sales book) is intended. As a result a book data set is generated with which is associated an identifier in the ledger structure, for example a serial number. Before or during the recording of data of the business transaction or as a function of the recorded data an account object of this book account is selected, a book account being an account with which the selected ledger structure is associated. In the case of a sales book this is for example a debtor account of the customer. The account number of the book account, for example of the debtor account, is likewise recorded in the book data set. Alternatively a book account (e.g. debtor account) can first of all be selected and depending upon that the ledger structure can be selected. Before or after the input of further data or also automatically as a function of the selected book account, at least one account object of a cross-account is selected. Finally all remaining data of the business transaction are read in. Using the selected ledger structure, the selected accounts and the read-in data a plausibility check of the input can then be undertaken. In order to carry out the plausibility check the identifier data structures of the selected account objects are preferably accessed, whereby the data contained therefor example contain information concerning the respective cross-accounts which can be associated therewith and the permissible entry types. A book data set is then generated from the read-in data for storage in the ledger structure. Furthermore at least two partial entry data sets are generated from the read-in data. Not only the book data set but also the appertaining partial entry data sets acquire an identifier which facilitates association and subsequent retrieval of the book data sets and partial entry data sets which belong to one another. The identity of the ledger structure together with the identifier of the book data set together form a record identification. The record, which is always necessary, is formed from the thus identified book data set and the partial entry data sets and can be displayed or printed out. The at least two partial entry data sets are then sent to the account objects of the book account and of the cross-account or the cross-accounts, the partial entry data sets containing those values of the business transaction which should effect corresponding changes of account values. The transmission of the partial entry data sets to the accounts takes place by transmission of messages to the interfaces of the account objects, as indicated in FIG. 1. The partial entry data sets are received by the account objects, the data of the partial entry data sets being initially preferably stored in a buffer store. The successful and complete reception of the partial entry data sets can then be notified to the user by a confirmation message to the ledger structure and or a corresponding display structure. The further processing of the data of the partial entry data sets is then carried out within the account objects automatically and independently of the other account objects concerned. With the aid of the operations of the account objects not only the chronological store table for the partial entry data sets but also the collective store structures are updated.

Figure 2:
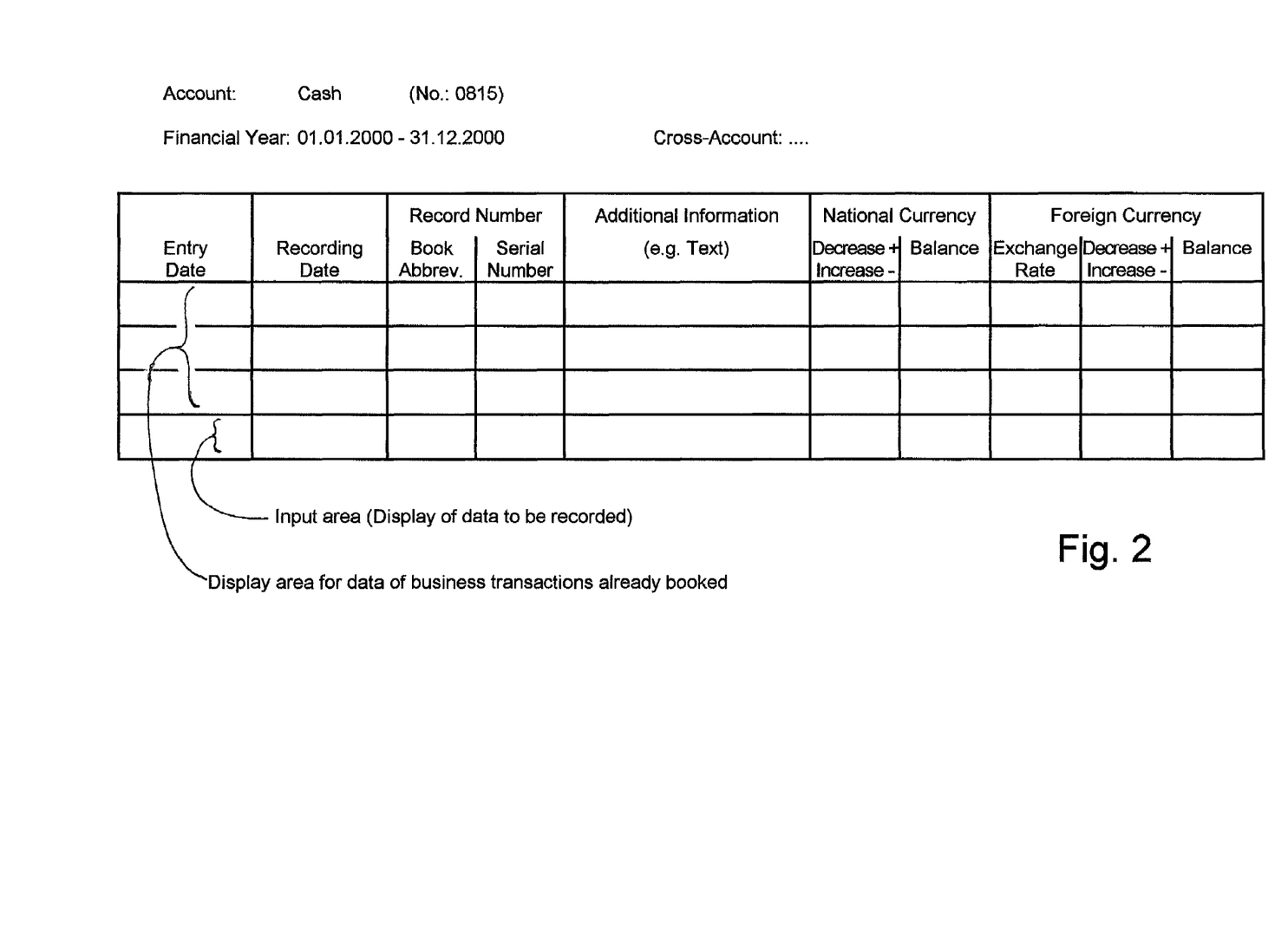
FIG. 2 shows a section of a display screen representation of an account.

As already described, the operations which can be carried out on the data within an account object are a component of the account object. These operations include those which can be carried out in the case of each account object, for example those which concern the reading in, output and storage of data in the chronological store table and the collective store structures. Furthermore, there are operations which are implemented only in the case of selected account objects. In the case of debtor accounts such operations can for example encompass the triggering of warnings. The operations also encompass the display of the data contents and a selection display for the operations to a user. The access to certain operations can be restricted for selected categories of users. The operations, which may be called modes of operation, which can be selected in the case of an account object are for example displayed in the form of a selection list in a window which can be called up by a user. These operations comprise for example the display of a section of the store table for a predetermined time interval or the display of certain stocks by access to the corresponding data of the collective store structures. The operations and the data of the identifier data structure can moreover fix the display screen input mask tailored to the respective account. This input mask has input fields which comprise standard fields which are present in every type of account and variable fields which depend upon the type of account. The standard fields include for example fields for the financial year, the account number (or another identifier), the entry data, the recording date, the record number (which consists for example of a book abbreviation of the ledger structure and a serial number) and the type of entry. An example of a section of a screen representation for display of entry data sets is shown in FIG. 2. The standard fields also include at least one field into which the amounts (values) to be entered can be input. In this case at least one field is provided for values in the national currency. The values characterise an amount, a preceding sign and a unit of measurement which may be implicitly present or explicitly stated. The preceding sign may also result implicitly from the selected input/display field, for example when not only a field for credit but also a field for debit are to be provided. At least a value in the national currency is to be recorded in a partial entry data set for an account.

In addition to this, further fields can be provided for amounts in foreign currencies with fixed or variable exchange rates or for details of quantities. The details of quantities can be differentiated according to stock quantities for which the record is to be kept and input quantities which trigger changes in the stocks. The quantities are also differentiated with regard to the physical values used, for example volume, mass, weight, number of items. The physical values used can be different for the stock quantities stored in the collective store structure and the input quantities, in which case conversions are to be carried out if need be.

The variable fields used depend upon the type of account. These include for example fields for supplementary data, such as numbers of the bank statement and numbers of the till statement, for extraneous record data, such as the record date and the record number, for data on setting value, on the period and on the tax period as well as for the account content, reference data, batch numbers and release data.

FIG. 2 shows a greatly simplified example of a display screen representation of a sample account. Data specifying the account and the financial year and also the possible cross-account are set out by means of a table. In the table the column headings give designations of the fields displayed below them. Below these are table lines, and in each line in an upper display area these table lines display data for business transactions already booked to the account. The partial entry data sets displayed in the display area correspond for example to the last ones recorded. Below the display area, for example below the last recorded partial entry data set, an input area is provided into which a user can input the values of a business transaction to be newly recorded. Some of the values can already be predetermined automatically. Although the input area and the display area are represented immediately below one another on the screen, it is for example not necessary for the buffer store for the input area to be located within the particular account object from which the data for the display area have been acquired. Possible methods for generating the display in connection with the recording of operator inputs and their immediate representation on the screen and for acquiring and transmitting the recorded data are known in the prior art and do not need to be described in greater detail at this point.

The input area for the recording of data can also be represented in the format of an input record, for example in the form of an invoice. Thus selected accounts can have associated with them different types of input records or input masks which are adapted to the type of account and the types of entry taking place. Furthermore, for example, a window can be displayed which presents balances from extraneous records, in particular from bank statements, so that a user whilst making the entries can follow whether his inputs produce a balance which tallies with that of an extraneous record. Finally, it is possible to generate displays which represent the data of stocks. This are generated from the collective store structures of the addressed account objects.

The stocks can be displayed for example in the form of a stock register which can be used with open entries of invoices for incomings or outgoings as well as with stores. This is a permanent record of the individual part-quantities until they are exhausted. The data which result in the respective stocks are not deleted but are retained so that on any qualifying date the stock and its composition can be displayed. In order to display a stock register, preferably those collective store structures are accessed in which the start values of the data storage fields correspond to the end values of the data storage fields of the respectively preceding time interval. The end stock of the respective preceding year is taken as the starting stock of the current year.

In other types of account a stock table can be displayed. This is used for example when displaying certain commitments, such as wages/salaries, and taxes, such as for example turnover tax. The display comprises a table, on the lines of which are shown the sub-types, such as for example obligatory and voluntary wages or obligatory or voluntary turnover, and in the columns a total balance and its distribution over periods of time, as a rule on a monthly basis, is shown.

A third possibility for a display which is obtained from the data of an account object is the development table which is used in particular in the case of items of the fixed assets. This table contains on the lines sub-types, for example land, building, machines, and in the columns it contains the development according to entry type, beginning from the starting stock through incomings and outgoings to the end stock.

All account objects are based on a uniform basic structure, i.e. on an object from which the account objects have inherited predetermined properties. The use of account objects which are uniform in this respect for all subject areas. i.e. for the main ledger bookkeeping with integrated subsidiary books for customers and suppliers and for non-integrated subsidiary books such as wages and salaries accounts, equipment accounts and materials accounts, simplifies not only the programming but also the operation and permits the integration of all part-areas of accounting. Nevertheless the account objects are very flexible and can be adapted to a large number of special requirements for certain types of accounts. Thus with regard to the properties of the account objects an account hierarchy of the inheritance is built up.

However, the system according to the invention goes a step further in that not only for business management analyses, such as for example profit and loss calculations and balance sheets at the level of an individual business or at group level, the account objects which contain in their collective store structures certain summary values are accessed and the analyses are generated therefrom, but also that special analysis objects are provided for all or some of the output data or positions of the analysis scheme. The analysis objects are similar to the account objects; in addition to an identifier data structure and certain operations they contain one or more collective store structures. In the collective store structures those values from which the output presentation of a business management analysis is generated are constantly updated. This speeds up the generation of current analyses substantially. This is explained in greater detail below.

The analysis schemes to be generated for the output presentation are as a rule tables with a commercially usual content and thus in which the division into lines and columns is basically fixed. Examples of such analysis schemes included balance sheets and profit and loss calculations for individual businesses and groups, profit and loss calculations as cover contribution calculations, statistics, such as for example customer group turnover statistics and article group turnover statistics, lists and plans for liquidity control or also analysis schemes which relate not only to specific accounts, such as for example the presentation of the fixed assets as a development table, which access a plurality of accounts associated with the individual goods.

The analysis schemes contain a plurality of (table) fields into which predetermined values are to be entered before output/printing. At the lowest level these fields contain for example values which can be read out directly from individual account objects. Furthermore the analyses contain a series of fields or positions of which the values result from account values from several or even many account objects. Above all for the last-mentioned fields analysis objects are provided which contain collective store structures of the type also used in the account objects. The collective store structures of the analysis objects store summary values for predetermined time intervals from which the output fields of the analysis schemes can be generated in a simple manner (few additions) without recourse to the account objects.

The constant updating of the collective store structures of the analysis objects is—in contrast to the collective store structures of the account objects—carried out not on the basis of partial entry sets (which are based on the recording of data concerning business transactions) received by the analysis object but on the basis of update data sets. The update data sets are transmitted as components of messages from account objects to the analysis objects. Each analysis object contains update data sets of those account objects which it brings together in the analysis scheme or of which the account changes have an influence on the value to be represented in the analysis scheme.

Figure 3:
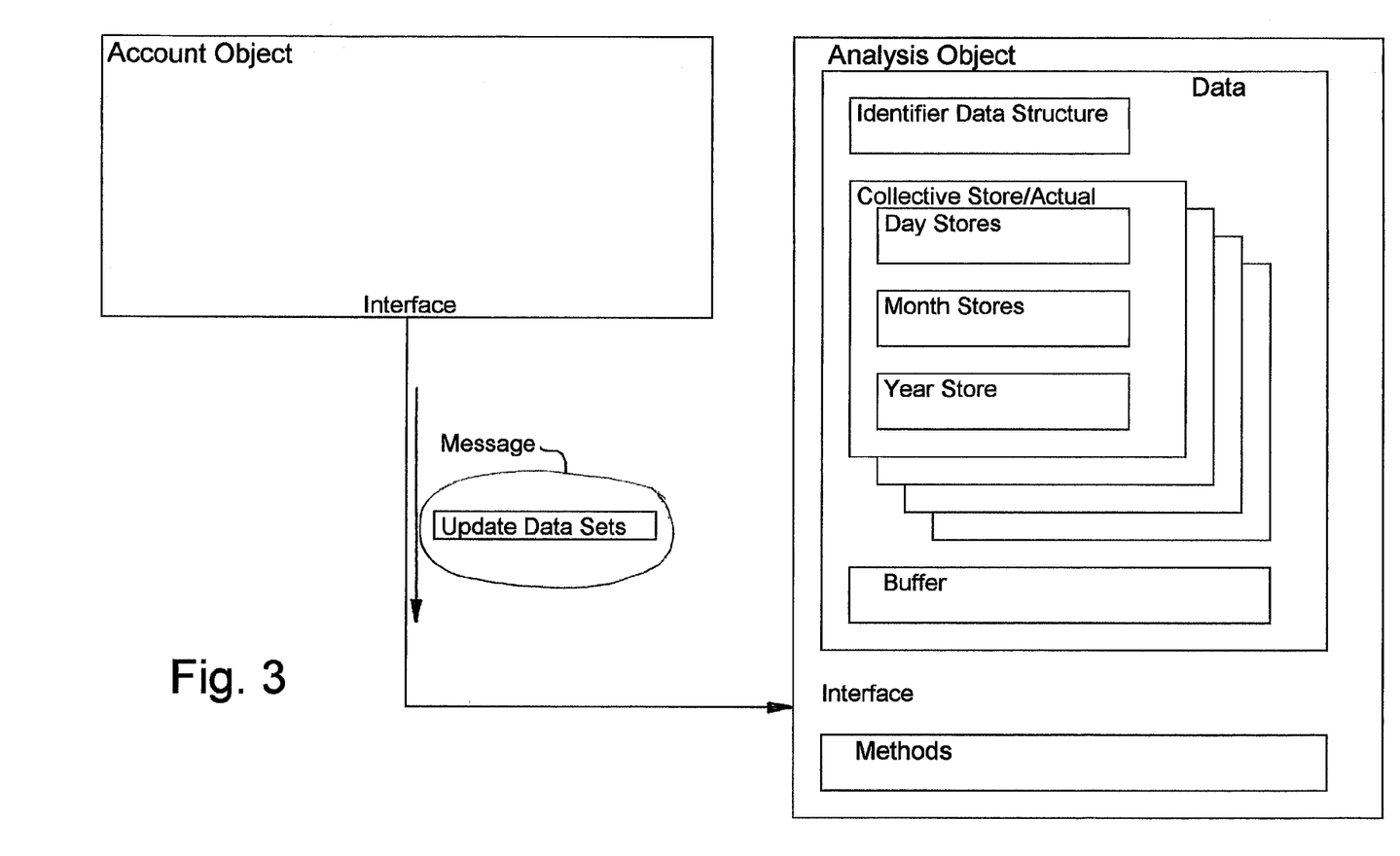
FIG. 3 shows a diagrammatic sketch which illustrates an analysis object and the transmission of an update data set from an account object to the analysis object.

FIG. 3 shows the analysis object used in the system according to the invention and the reception of an update data set from an appertaining account object.

The analysis object according to FIG. 3 in turn comprises data as well as operations (methods) which can be carried out on the data The data include an identifier data structure which unambiguously characterises the analysis object. The identifier data structure contains for example a number which characterises the analysis scheme in which is situated the position or the table field with which the analysis object is associated. Furthermore the identifier data structure contains an unambiguous identification of the position within the analysis scheme (e.g. column and line number). An analysis object can also be associated with a plurality of analysis schemes and different positions within the plurality of analysis schemes. For example an analysis object can combine a group of debtor accounts. Such an analysis object combining debtor accounts can be used in various analysis schemes. The identifier data structure can also contain an identification of those account objects from which the analysis object may receive update data sets. This facilitates checking with regard to the receipt of permitted update data sets.

The data of the analysis object also include at least one collective store structure. Each collective store structure contains—as also do those of the account objects—a plurality of data fields which are associated with time intervals of the calendar days, calendar months and of the calendar year. In the data storage fields values are added up which by means of predetermined functions are calculated form the values of the update data sets. In the simplest case an update data set contains a value of a business transaction to be added in an account object and which is to be added in the a similar manner in the collective store of the analysis object. In this simple case the analysis object carries out the same updates on the collective store as the account objects associated with it, albeit for the total of the account objects. Like the account objects, the analysis object can contain collective store structures for further values (foreign currencies, quantities), collective store structures for actual values of preceding years as well as collective store structures for several levels (plan level, process level, liquidity level).

The analysis object can also contain a buffer in which the data of the received update data sets is first of all entered before the analysis object undertakes an update of its collective stores with the aid of the methods inherent in it.

The analysis object receives the update data sets from account objects associated with it. The account objects, which transmit update data sets to certain analysis objects, contain a data structure which identifies those analysis objects to which update data sets should be sent. This identification structure, also denoted as a read-in strip, for the receiver of update data sets can additionally contain conditions which analysis objects are to be supplied with update data sets in the case of which business transactions. When an account object receives a partial entry data set which is based on a predetermined business transaction with a time associated with it, then operations are started in the account object which as a function of the read-in strip establish whether update data sets are to be generated and sent to predetermined analysis objects. Then the values to be introduced into the update data sets are taken from the partial entry data set and stored in the update data sets. As a rule only some of the data of the partial entry data set are taken for an update data set. For example, only the values relating to the currency are taken from a partial entry data set which contains not only amounts of currencies but also details of quantities of goods for an analysis object which only comprises a financial analysis. Conversely, for an analysis object which relates to quantities of goods, only those values which relate to the relevant quantities are taken from a partial entry set and put into an update data set. The update data set is sent in a message from the interface of the account object to an interface of the analysis object. The methods implemented in the analysis object then ensure interim storage of the update data set in a buffer and updating of the collective store structures of the analysis object.

Furthermore it is possible that the analysis objects themselves in turn generate update data sets from the received update data sets and send the newly generated update data sets to superior analysis objects. For example the account objects of a business could send update data sets to analysis objects of the business which are required for an analysis scheme of a balance sheet of the business. Then the analysis objects of the balance sheet can in turn generate update data sets which are transmitted to analysis objects of a superior group parent company.

Analysis objects can also comprise warning functions or can even be instruction or warning analysis objects (i.e. merely fulfil these warning functions). Such warning functions or warning analysis objects acquire from predetermined account and/or analysis objects (to be monitored) update data sets which contain values to be monitored. As soon as these values to be monitored and/or certain summary functions of these values exceed or fall below predetermined limiting or threshold values, an instruction to a user (for example to a user in a superior department and/or a management level) is generated automatically by the warning function of the analysis object or by the methods of the warning analysis object. Alternatively it is possible in certain account objects to implement methods which under predetermined conditions generate warning update data sets and send these warning update data sets to signalling analysis objects of a superior level. The two cases referred to differ in the respective place at which the conditions are monitored; in the first-mentioned case the threshold value conditions are implemented by methods of the receiving warning analysis objects, in the last-mentioned case they are implemented in the transmitting account objects.

In the case of certain analysis objects it is possible on certain levels, in particular on the planning level, to generate update data sets directly (bypassing the account objects) from inputs of planning data and to send these to the analysis objects so that with the aid of these planning update data sets the collective store structures of the analysis object are updated for the planning level. The update data sets acquired from inputs are consequently not generated by account objects. Such a procedure is advantageous for example when an analysis object combines a plurality of account objects, for example when the analysis object represents the total of all debtor accounts, and when an input of plan data into the individual account objects (for example the debtor accounts associated with the individual customers) is to be avoided because of missing or unnecessary detailed information. In this case the account objects in the planning level remain unchanged or empty and an update data set which updates the collective store structure of the analysis object in the planning level is transmitted directly from a planning input to the superior combining analysis object. Since in such a case the collective store structure of the planning level no longer represents the total of the individual plan collective store structures of the account objects which remain empty, a display is also necessary in the analysis object which indicates that the planning value of the analysis object no longer represents the total of the planning values of the appertaining account objects. Such a display can be generated automatically when an update data set comes in not from an account object but directly from a planning input. In the case of analysis objects which permit a direct input of simulated update data sets into the planning level, on the other hand, it must be ensured that such direct inputs cannot occur in the actual level of business transactions which are actually entered. The necessary stops can be implemented within the framework of the methods associated with the account object.

The invention claimed is:

1. A method for processing data concerning a business transaction in a computer system, the computer system having at least one processing unit, at least one storage unit, input means and output means and data communication means which couple the input and output means and the units of the computer system to one another, the data specifying a type of the business transaction, a time of the business transaction and values of the business transaction, the values indicating changes in account values of at least two predetermined accounts of a plurality of accounts, comprising:

provifing at least one ledger structure, the ledger structure having a storage structure for ordered storage of a plurality of book data sets, each book data set being associated with a business transaction, each book data set having associated with it a record identifier which unambiguously characterizes the ledger structure and the book data set within the ledger structure, and each book data set containing an account identifier, the account identifier identifying at least two selected accounts of the plurality of accounts, one of the at least two selected accounts being a book account with which the ledger structure is associated, and the further of the at least two selected accounts being cross-accounts associated with the book account, forming an account object for each account of the plurality of accounts, each account object having an identifier data structure and a storage structure for ordered storage of partial entry data sets, each partial entry data set of the storage structure containing the record identifier of a book data set associated with the partial entry data set as well as at least one value of a business transaction which shout& effects a corresponding change of account values of the account objects;

recording of-the data concerning the business transaction the recording including:

(a) selecting one of the at least one a-ledger structures, depending on the type of the business transaction, selecting an account object of a book account and at least one account object of a cross-account of the book account as a function of the type of the business transaction, the book account being an account with which the selected ledger structure is associated, and reading in of the data concerning the business transaction, (b) generating a book data set and at least two partial entry data sets from the data read-in in step (a), the book data set for storing in the storage structure of the ledger structure selected in step (a), one partial entry data set for storing in the storage structure of the account object selected in step (a), and at least one partial entry data set for storing in the storage structure of the at least one account object selected in step (a), the partial entry data sets containing the values of the business transaction which contemporaneously effect corresponding changes of account values of the selected account objects, (c) storing the book data set in order in the storage structure of the ledger structure selected in step (a), (d) sending each partial entry data set of the at least two partial entry data sets to its corresponding account object selected in step (a), and (e) receiving the partial entry data sets in the account objects and storing the partial entry data sets in order in the storage structures of the account objects.

2. The method as claimed in claim 1, wherein the account objects each have at least one collective storage structure, wherein each collective storage structure comprises a plurality of data storage fields, each data storage field being associated with a time interval having a start time and an end time within a calendar year and storing a sum value, wherein the start and end times of a first number of data storage fields are chosen so that the time intervals each correspond to a calendar month, wherein each sum value is produced from a start value and addends, the addends being in each case a predetermined function of the values of a business transaction of which the time falls within the time interval and with which the account of the account object is associated, and wherein in step (e) the collective storage structures are updated by adding up the addends formed from the values of the business transaction contained in the partial entry data sets in the data storage fields corresponding to the time of the business transaction.

3. The method as claimed in claim 2, wherein the collective storage structures have a second number of data storage fields in which the start and end times are chosen so that the time intervals in each case correspond to a calendar day, and wherein not only the time intervals of the first number of data storage fields which each correspond to a calendar month but also the time intervals of the second number of data storage fields which each correspond to a calendar day completely cover the time interval of a calendar year once.

4. The method as claimed in claim 3, wherein the plurality of data storage fields comprises at least one data storage field of which the time interval corresponds to the entire calendar year.

5. The method as claimed in claim 2, wherein the start values of the data storage fields can preferably be set (i) to equal zero, (ii) to a sum value of a data storage field of a data storage field of another collective storage structure of the account object.

6. The method as claimed in claim 2, wherein the predetermined function according to which the addends are calculated from the values of the business transaction comprises:

(i) setting of the addend to equal to a value of the business transaction so that the sum value corresponds to a balance, (ii) setting of the addend to equal to a value of the business transaction so long as this is greater than zero; otherwise setting of the addend to equal to zero so that the sum value corresponds to a credit balance, (iii) setting of the addend to equal to a value of the business transaction so long as this is less than zero;

otherwise setting of the addend to zero so that the sum value corresponds to a debit balance, (iv) multiplication of a value of the business transaction by a constant factor, or (v) multiplication of a value of the business transaction by a variable factor held a data storage field of a further collective storage structure which corresponds in the time interval.

7. The method as claimed in claim 2, wherein analysis diagrams are provided which have positions with position values, wherein changes of account values effect changes of predetermined position values, wherein for at least one selected position of an analysis diagram an analysis object is formed which has an identifier data structure and at least one collective storage structure, wherein the makeup of the collective storage structure of the analysis object corresponds to the makeup of the collective storage structure of an account object, wherein in the collective storage structure of the analysis object the addends are a predetermined function of those changes of account values which are effected on the basis of business transactions of which the time falls within the time interval, wherein in the recording of the data of a business transaction and the reporting of data concerning the business transaction the following further steps are carried out:

(f) generation of at least one update data set, which is determined for a selected position of an analysis diagram from the values of the business transaction contained in a partial entry data set, in at least one account object of those account objects which have received a partial entry data set, and sending of the update data set to at least one analysis object associated with the account object; and (g) reception of the update data set in the at least one associated analysis object and updating of the collective storage structure of the analysis object by adding up the addends formed from the values contained in the update data set in the data storage fields corresponding to the time of the appertaining business transaction.

8. The method as claimed in claim 7, wherein for the partial entry data sets and the update data sets a standard format is used and that messages of a standard format are generated for sending the partial entry data sets and the update data sets to the account objects or analysis objects.

9. The method as claimed in claim 7, wherein the identifier data structure of the account object generating the update data set preferably has a list of analysis object identifiers of the associated analysis objects.

10. The method as claimed in claim 7, wherein the analysis diagrams have positions of a lowest level with which predetermined collective storage structures of predetermined account objects are associated, wherein as a function of an output command indicating an analysis time a financial year a graphic output of an analysis diagram is generated via an output means, and this graphic output the total of the sum values of those data storage fields of the collective storage structure of the account object of which the time intervals cover the time period from the beginning of the financial year up to the analysis time is output at each position of the lowest level which is associated with account object, the total of the sum values of those data storage fields of the collective storage structure of the respective analysis object of which the time intervals cover the time period from the beginning of the financial year up to the analysis time is output at the selected positions which are associated with analysis objects, and at the remaining positions values are output which are calculated from the values of other positions.

11. The method as claimed in claim 10, wherein input buffer stores in which the incoming values of the partial entry data sets or update data sets are buffered until the respective collective storage structure can be updated with the values are preferably associated with the collective storage structures of the account objects and analysis objects, and during the graphic output of an analysis scheme an instruction is generated for the user if the input buffer store still contains values with which a time before the analysis time is associated.

12. The method as claimed in claim 10 or 11, wherein a balance sheet, a profit and loss calculation, a turnover statistic or another business management analysis for a company or a group is represented by the graphical output of an analysis scheme.

13. The method as claimed in claim 7, wherein all account objects have a first collective storage structure of which the sum values correspond to an amount which relates to a first unit, and wherein at least one account object has at least one second collective storage structures of which the sure values correspond to an amount which relates to a second unit.

14. The method of as claimed in claim 13, wherein all analysis objects have a first collective store structure of which the sum values correspond to an amount which relates to a first unit.

15. The method as claimed in claim 7, wherein all the account objects and analysis objects each contain at least one actual collective storage structure for the current calendar year which store values resulting from business transactions actually concluded.

16. The method as claimed in claim 15, wherein all the account objects and analysis objects each contain at least one actual collective storage structure for one or more elapsed calendar years which store values resulting from business transactions actually concluded.

17. The method as claimed in claim 15, wherein account objects and analysis objects selected for planning each have at least one plan level collective store structure for the current calendar year and one or more future calendar years which store values resulting from planned business transactions.

18. The method of as claimed in claim 17, wherein the account objects and analysis objects can each have at least one process level collective storage structure for the current calendar year and one or more future calendar years which store values which result from the values of the plan level collective storage structures and/or from values for uncompleted business transactions resulting from purchase, storage, production and/or sales agreements to be implemented in the respective calendar year.

19. The method as claimed in claim 17, wherein the account objects and analysis objects in each case have at least one further collective storage structure for the current calendar year and a future calendar year which store values which relate to a liquidity resulting from the planned values and the actual values.

20. The method as claimed in claim 1, wherein the storage structure for ordered storage of the book data se of the ledger structure and the storage structures for ordered storage of the partial entry data sets of the account objects are preferably sorted or respectively indexed lists or tables which are sorted or indexed according to the serial number of the entry of the data sets or according to the time of the business transaction.

21. The method as claimed in claim 1, wherein the identifier data structure has a character string and/or number which unambiguously denotes the account object.

22. The method as claimed in claim 1, wherein the identifier data structures of the account objects of the book accounts each contain an indication of the cross-accounts which can be associated with them, wherein in step (a) the at least one account object of a cross-account is selected as a function of the indication of the cross-accounts which can be associated with the book account.

23. The method as claimed in claim 22, wherein the identifier data structures of the account objects of the cross-accounts each contain an indication of those accounts with which they can be associated as cross-accounts, wherein in step (a) the at least one account object of a cross-account is selected as a function of its display of those accounts with which it can be associated as cross-account.

24. The method as claimed in claim 1, wherein
the ledger structure and/or the account object of the book account are selected as a function of a user input, and
wherein the at least one account object of the at least one cross-account is selected as a function of the input of a part of the data concerning the business transaction which contains at least the type of business transaction.

25. The method as claimed in claim 24, wherein the user input comprises a selection of a graphical tree structure displayed to the user on an output means.

26. The method as claimed in claim 24, wherein a further cross-account is always offered to the user for selection when it is apparent that a total of predetermined values of the partial entry data sets of the already selected accounts created on the basis of the data concerning the business transaction is not equal to zero.

27. The method as claimed in claim 1, wherein the data read in in step (a) are held in a buffer store in a pre-recording mode until
all appertaining account objects are selected,
the book data set and the partial entry data sets have been generated an
the partial-entry-data sets have been checked at least to establish that a total of predetermined values of the partial entry data sets created on the basis of the data concerning the business transaction is equal to zero.

* * * * *

UNITED STATES PATENT AND TRADEMARK OFFICE
CERTIFICATE OF CORRECTION

PATENT NO. : 7,379,906 B2 Page 1 of 1
APPLICATION NO. : 10/018047
DATED : May 27, 2008
INVENTOR(S) : Schellmann et al.

It is certified that error appears in the above-identified patent and that said Letters Patent is hereby corrected as shown below:

Col. 21, Claim 1, line 46, please delete "shout&".

Col. 21, Claim 1, line 47, please delete "objects" and insert -- object --.

Col. 21, Claim 1, line 48, please delete "of-the" and insert -- the --.

Col. 21, Claim 1, line 50, please delete "a-ledger" and insert -- ledger --.

Col. 24, Claim 20, line 64, please delete "se" and insert -- set --.

Signed and Sealed this

Nineteenth Day of May, 2009

JOHN DOLL
*Acting Director of the United States Patent and Trademark Office*